July 8, 1947.  H. W. DECKER  2,423,586
CARRIAGE RETURN MECHANISM FOR TYPEWRITERS
Filed Aug. 7, 1944  7 Sheets-Sheet 1

INVENTOR.
HERMAN W. DECKER.
BY Warren S. Orton
ATTORNEY

July 8, 1947.   H. W. DECKER   2,423,586
CARRIAGE RETURN MECHANISM FOR TYPEWRITERS
Filed Aug. 7, 1944   7 Sheets-Sheet 2

INVENTOR.
HERMAN W. DECKER.
BY Warren S. Orton.
ATTORNEY

July 8, 1947. H. W. DECKER 2,423,586
CARRIAGE RETURN MECHANISM FOR TYPEWRITERS
Filed Aug. 7, 1944 7 Sheets-Sheet 3
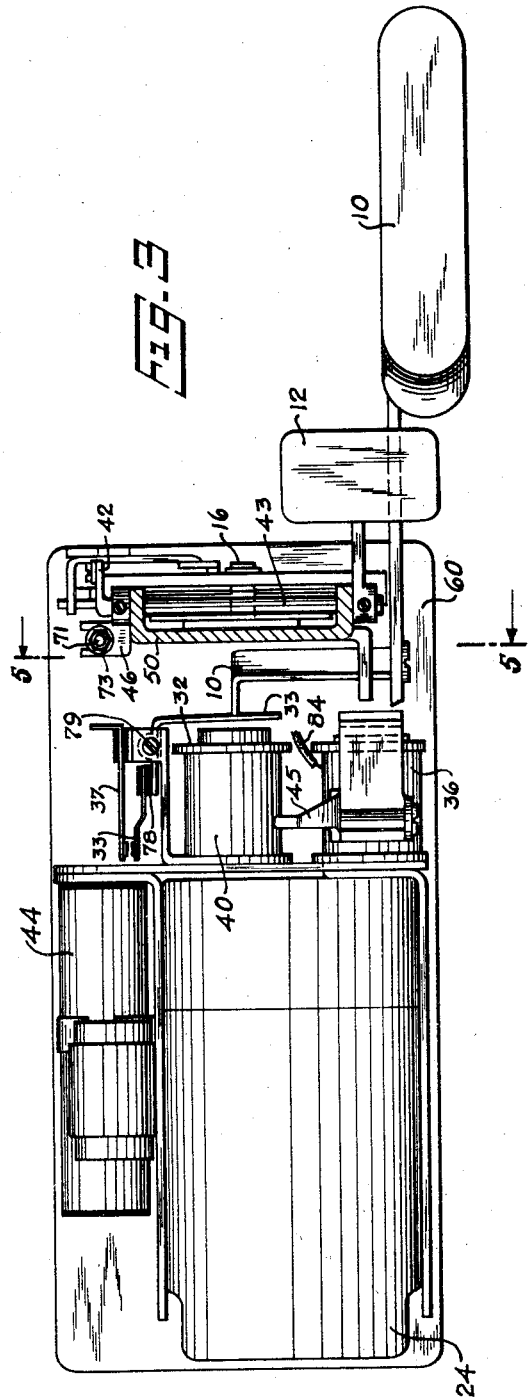
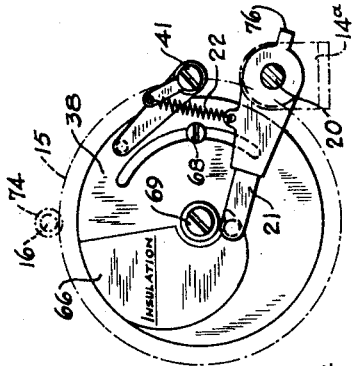
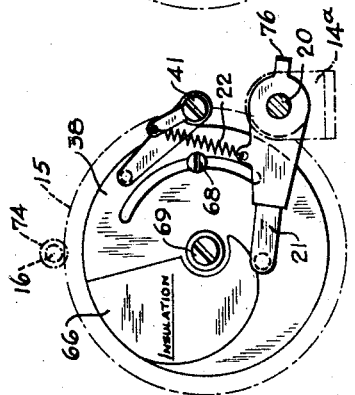
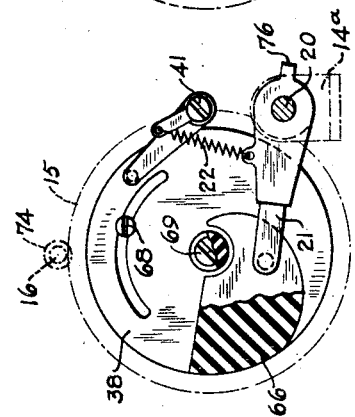
INVENTOR.
HERMAN W. DECKER.
BY Warren S. Orton.
ATTORNEY July 8, 1947.  H. W. DECKER  2,423,586
CARRIAGE RETURN MECHANISM FOR TYPEWRITERS
Filed Aug. 7, 1944  7 Sheets-Sheet 4
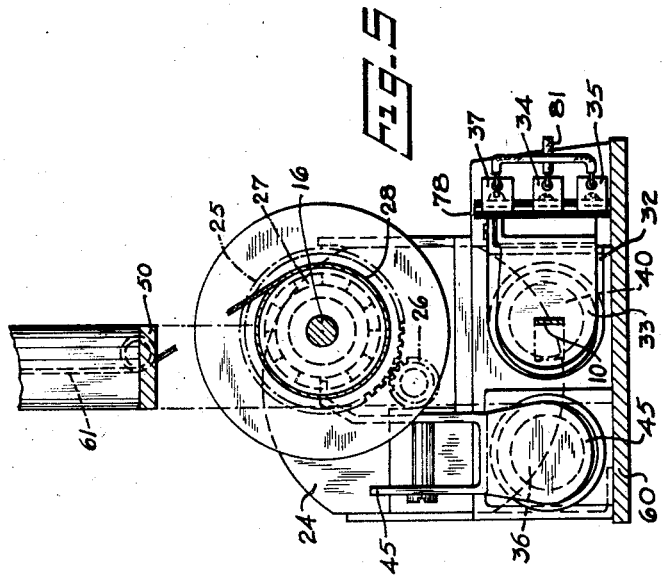
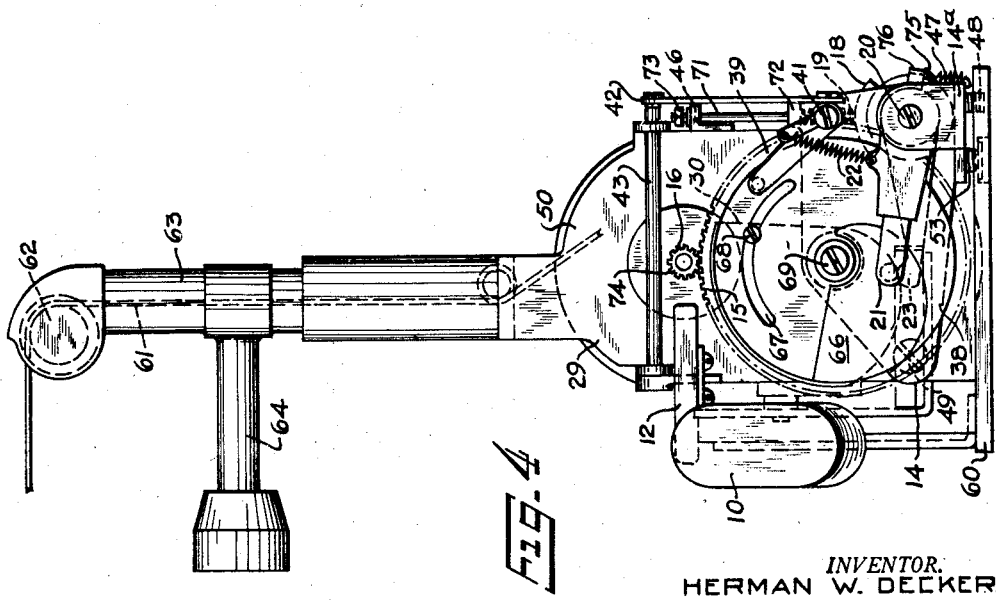
INVENTOR.
HERMAN W. DECKER.
BY
ATTORNEY

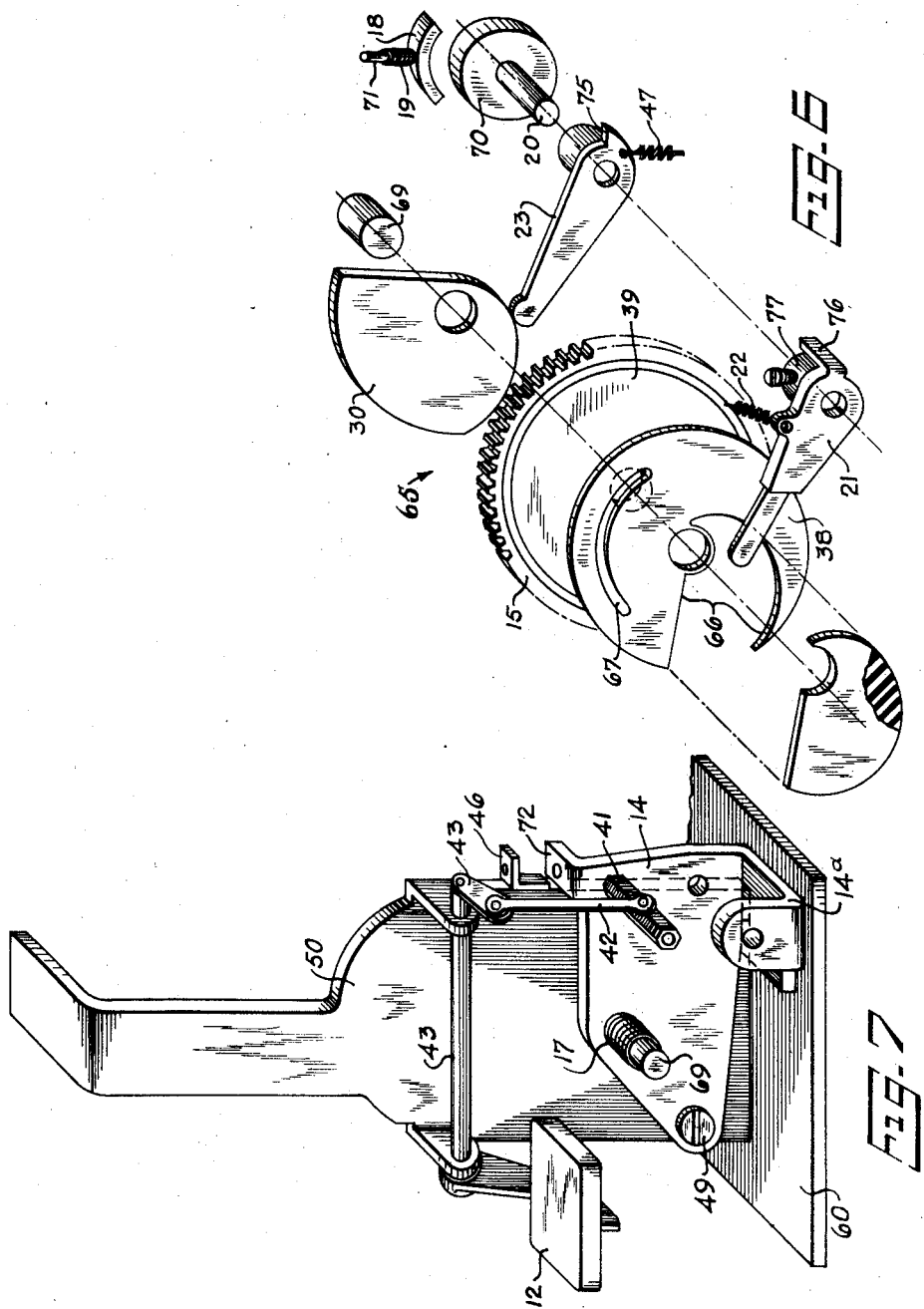

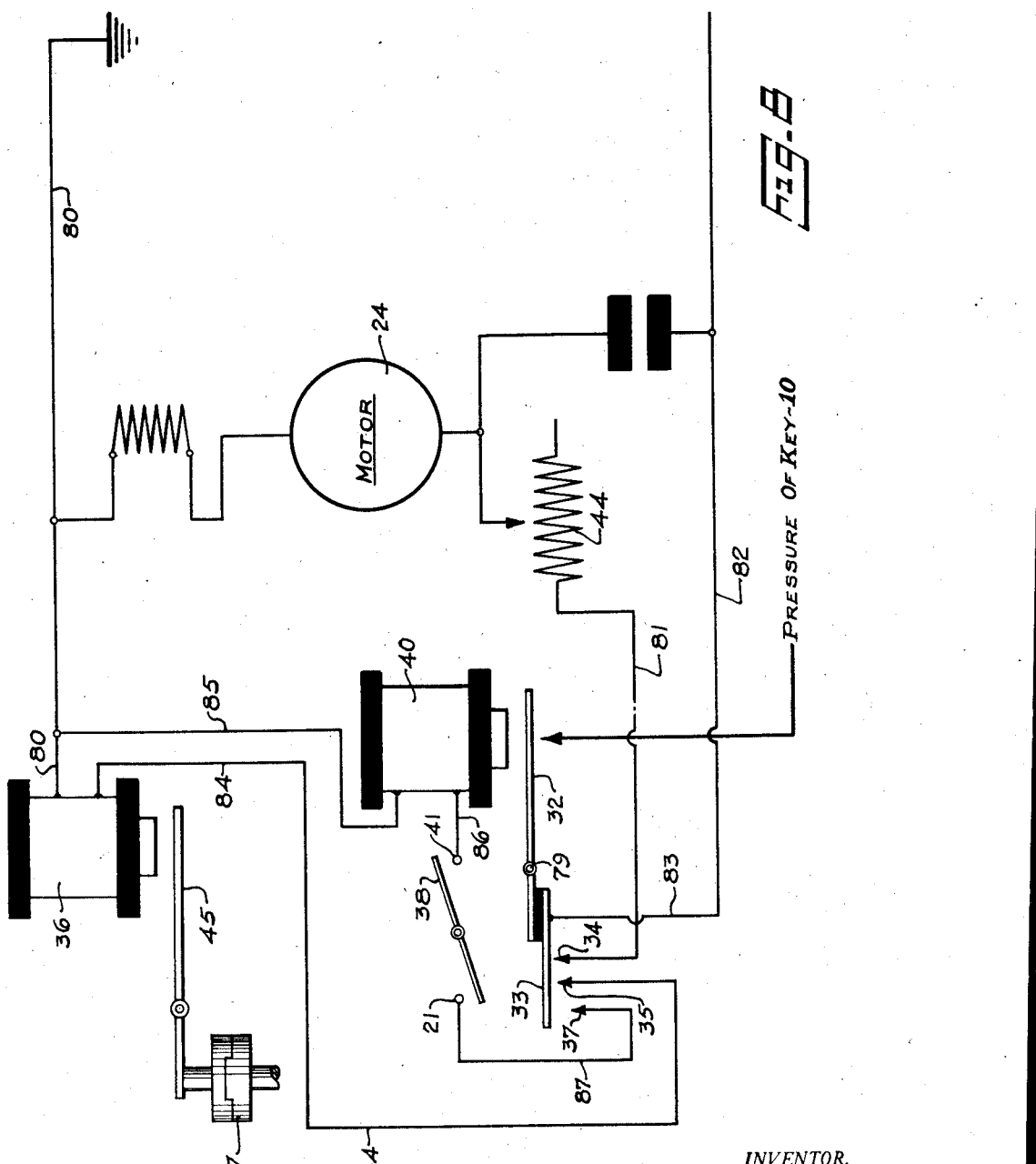

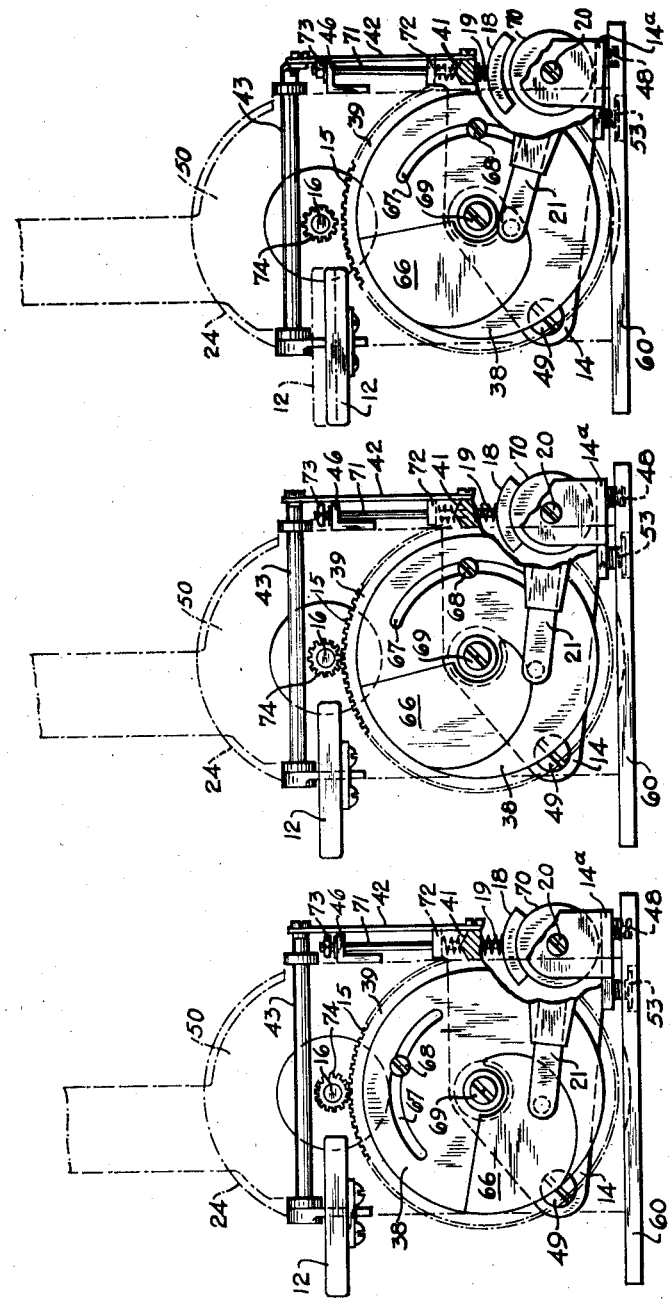

Patented July 8, 1947

2,423,586

UNITED STATES PATENT OFFICE 2,423,586

CARRIAGE RETURN MECHANISM
FOR TYPEWRITERS

Herman W. Decker, East Port Chester, Conn., assignor to Elinor W. Decker, East Port Chester, Conn.

Application August 7, 1944, Serial No. 548,516

33 Claims. (Cl. 197—66)

The invention relates to typewriter carriage return mechanism of the type which automatically returns the typewriter carriage selectively either to its line beginning position or to an intermediate position at will and which mechanism may be either built into the typewriter as a fabricated part thereof or which may constitute an attachment to any of the standard makes of typewriters now in general use.

Carriage return mechanisms now known embody a multiplicity of small mechanical parts any one of which is quite apt to become loose or displaced especially under the severe usage to which devices of this character are usually subjected with the result that the whole apparatus often becomes inoperative and necessitates the service of a skilled mechanic to again place it in working condition. Such known devices are further complicated by the necessity of using two control keys and their associated chain of small parts, one to effect a full and the other to effect a limited return of the carriage.

The primary object of the invention is to provide an extremely simplified form of automatic carriage return device featuring the minimizing of the number of parts which might become loose or inoperative while the device and its associated typewriter are subjected to severe use.

Incidental to the general desire for simplification the present disclosure features the use of a single control key operable when partially depressed to provide a control for the desired extent of run of the carriage towards its line beginning position and when fully depressed even momentarily and thus without necessity of a sustained load thereon, to cause automatically a full coasting of the machine back to its line forming position.

Another object of the invention is to provide a simple form of reset mechanism by means of which the line beginning position of the device may be quickly and accurately set and reset at will simply by pressing a reset key and conventionally shifting the typewriter carriage to the desired starting position, with the assurance that until again reset the carriage will always return to such line beginning position simply by fully depressing the control key.

Various other objects and advantages of the invention will be in part obvious from an inspection of the accompanying drawings and in part will be more fully set forth in the following particular description of one form of typewriter carriage return mechanism embodying the invention, and the invention also consists in certain new and novel features of construction and combination of parts hereinafter set forth and claimed.

In the accompanying drawings:

Fig. 3 is a view looking down upon the device shown in the preceding figures with certain parts omitted;

Fig. 4 is an end view of the machine as viewed from the plane indicated by the line 4—4 of Fig. 1;

Fig. 5 is a transverse sectional view taken on the plane indicated by the line 5—5 of Fig. 3 looking in the direction indicated by the arrows;

Fig. 6 is a composite view showing certain of the details of construction of parts otherwise shown in different parts of the preceeding figures;

Fig. 7 is a perspective view showing interlocking frame and associated parts;

Fig. 8 is a wiring diagram of the electrical parts shown in the preceding figures;

Figure 1:
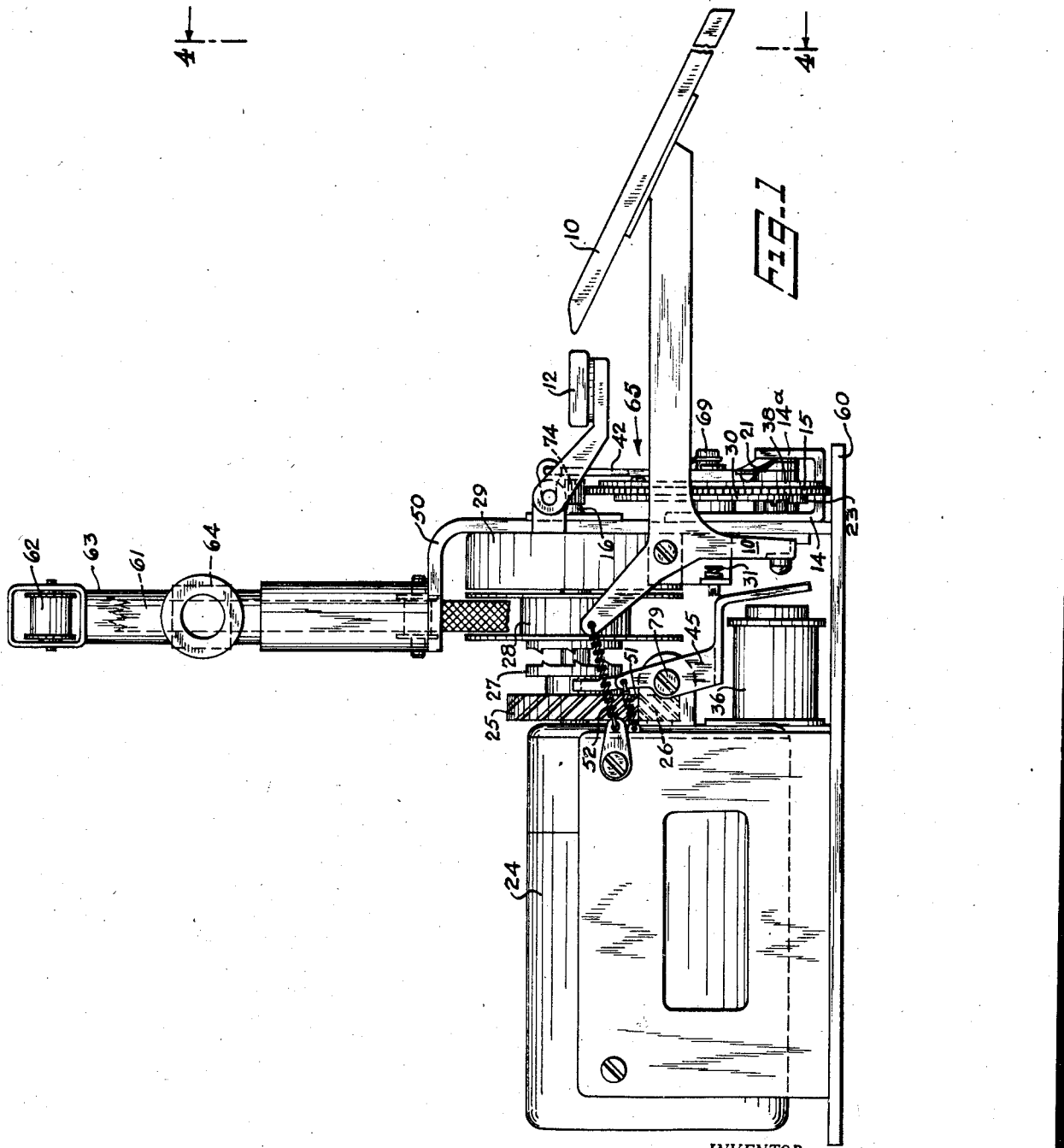
Fig. 1 is a view in side elevation of that side of a preferred embodiment of the invention which is adjacent the typewriter the carriage of which is controlled thereby.
Figure 2:
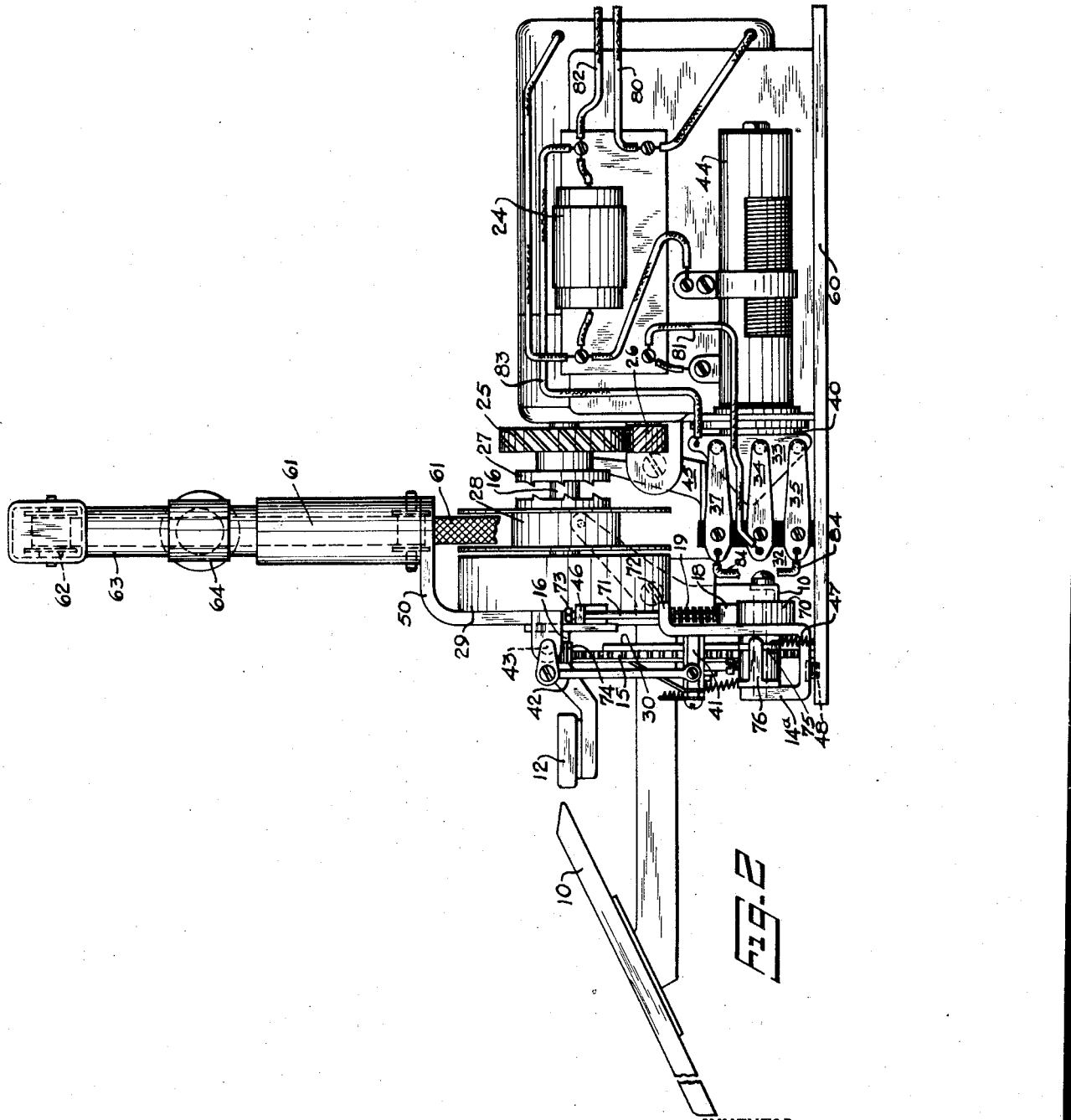
Fig. 2 is a view similar to that of Fig. 1 showing the opposite or outside of the device shown in Fig. 1.

Figs. 9 to 11 inclusive are detailed views illustrating several succeeding positions of the motor release mechanism, with parts omitted for clearness, and Figs. 12 to 14 are detailed views of the braking mechanism when marginal set key 12 is depressed, with cam 30 and associated levers omitted and with the clearance shown between the spur-gear pinion 74 and the spur-gear 15 greatly exaggerated in Fig. 14.

In the several figures there is disclosed a supporting plate 60 on which the several parts hereinafter disclosed are mounted with such insulation of the parts one from another as may be necessary to avoid short circuiting. The device considered as a whole is designed to be mounted on the same support which carries the typewriter controlled thereby in such way that the carriage return mechanism considered as a whole is immovable relative to the typewriter. Mounted upon the support 60 by means hereinafter disclosed is a tape reel 28 on which is wound a length of tape 61 trained across a pulley 62 and having its free end secured to the shift lever of the typewriter carriage following conventional practices in this respect. Also following known practices the structure includes an adjustable post 63 for carrying the pulley 62 and which post is spaced from the adjacent side of the typewriter frame by means of a spacing bar 64.

Mounted upon the base 60 is an electric motor 24 for winding the reel in the direction to act through the tape to return the carriage to its right hand or line starting position whenever a carriage return key 10 located convenient to the operator and a little offset to the right of the bank of type keys is depressed. It is a feature of this disclosure that the device employs only a single key to effect the carriage return.

The motor shaft is provided with a small pinion gear 26 in mesh with a driven clutch gear 25 preferably both being helical gears for smooth action. A clutch spur gear 27 turns with the clutch gear 25 and runs free on a pinion shaft 16. Reel 28 is secured to the pinion shaft 16 to turn therewith and any slack on the ribbon or tape is taken up by means of a spiral tension spring (not shown) attached to reel 28 and fastened to housing 29 which encloses the spring. From this construction it is understood that the motor when running may be connected to drive the reel in the direction to take up the tape under draft tension to return the typewriter carriage whenever the clutch elements at 27 are moved into interclutching relation. Mounted on the base 60 in advance of the motor (Fig. 1) is a clutch magnet 36 operating through its armature which is bent to form a clutch lever 45 terminating at its upper end in a yoke which engages in a groove formed between gear 25 and clutch spur 27. Clutch lever return spring 51 tends to restore clutch spur 27 to its unclutched, inoperative position when the clutch magnet is deenergized.

Secured to the pinion shaft 16 at its outer or forward end is a motor release mechanism designated as a whole by the reference character 65 and designed to rotate as a unit about the axis of its carrying pinion shaft 69. This unit consists of four parts arranged in sandwich relation and includes at its forward end an electrical contact plate 38 in the form of a thin metallic sheet circular in outline having a cut out blank space 66 in its perimeter as best shown in Fig. 6. Contact plate 38 is rotatably adjusted in a recess formed in the front side of an insulation plate 39. By means of an arcuate slot 67 in the plate 38 and a binding screw 68 threaded into insulating plate 39, the electric contact plate 38 may be rotatively adjusted about its own axis at 69 to set the same relative to a fixed contact post 41 and to a shiftable contact lever 21 hereinafter described.

The contact plate 38 is designed in its halfcrescent bottom portion to govern the point at which the plate moves away from the contact 21 to intercept the motor circuit. Differently expressed the curve defining the bottom edge of the insulating blank space 66 is so contoured that the motor circuit is broken either with a short angular turn of the plate 38, that is when the contact is elevated in a high position adjacent the axis at 69, or with a longer angular turn of the plate 38, as when the contact in its initial position is lower as when the carriage is set to have its normal long run during typing.

The insulation plate 39 is permanently fastened to a spur gear 15 sometimes hereinafter referred to as an electrical contact plate gear. When the parts are in operative position gear 15 is driven from the motor. A fixed setting cam 30 best shown in Fig. 6 is secured to the back of gear 15. From this construction it is understood that these four parts 15, 38, 39 and 30 rotate as a unit on a fixed stud 69 which projects forwardly from a vertically shiftable interlocking frame 14 carried by a vertically upstanding frame 50 having its lower end flanged as shown at 14a.

Secured to the shiftable interlocking frame 14 and located directly above the shaft 20 is the fixed electric contact post 41 forming the fixed contact of the two contacts 41 and 21 bridged by rotating plate 38 of mechanism 65.

Means are provided for presetting the shiftable contact 21 and thus the relative disposition of the fixed contact 41 and its companion 21 at the start of the operation incidental to depressing key 10. For this purpose there is offset to the right of the mechanism 65 extending from front to rear and journalled in the interlocking frame 14a lever shaft 20 on which is mounted in sideby-side relation a cam engaging lever 23 in rear of the mechanism 65 and the contact plate lever 21 in advance of this mechanism.

Normally it is intended that the shaft 20 when shifting contact lever 21 turns under restraint but when resetting the mechanism 65 to its zero position it is best to have the shaft 20 free from restraint. To provide the restraint the rear end of shaft 20 is provided with a relatively large flat cylindrical form of brake drum 70, and a brake shoe 18 therefor is disposed normally to exert load radially on the braking surface of drum 70 through the agency of spring 19 coiled about a vertical shaft or guide rod 71. The upper end of spring 19 bears against fixed stop 72 forming a flange-like projection from the upper edge of the shiftable frame 14. The upper end of the vertical shaft 71 passes through stop hanger 46 projecting laterally from the adjacent edge of the fixed vertical frame 50 and is provided at its upper end with an adjusting stop nut 73. The parts are so designed that whenever the interlocking frame 14 is depressed by the action of the marginal set key 12 as hereinafter described, stop hanger 46 which is fixed in place restrains brake shoe 18 from lowering with the lowering of the brake drum and thus acts to hold it away or free from the brake drum.

It is appreciated that in devices of this character it is desirable to vary the line starting position of the carriage from time to time and which carriage resetting is attained usually by adjustable stops on the carriage of the machine and which carriage stops limit the line starting and the line ending positions of the carriage as may be desired. The present disclosure provides means for presetting the line starting position of the carriage return mechanism herein featured so as to accommodate it to the variously located stops as conventionally preset on the typewriter. For this purpose there is provided a small marginal set key 12 located just above the main key 10. Key 12 is secured to one end of a reset shaft 43 the opposite end of which is turned outwardly and has secured thereto an upstanding reset shaft link 42, the lower end of which is fixed to contact post 41. Depressing key 12 acts to depress frame 14 and the parts carried thereby to disconnect the mechanism 65 as a whole from the motor driven pinion shaft 16.

Pressure on marginal set key 12 moves the interlocking switch frame 14 as a whole about its pivot pin 49 and thus disengages gear 15 from the spur gear pinion 74 which is formed integral on the outer end of shaft 16. When the gear 15 is thus disassociated from the motor the entire motor release mechanism 65 is free to rotate clockwise and is moved in this direction to its zero or minimum contact run position by means of a spring 17 sometimes hereinafter referred to as a contact plate gear return spring. In this zero position the free end of shiftable contact plate lever 21 is shifted by the cam 30 into its position nearest the axis of rotation of the plate 38, in electric engagement with the same and approximately in the elevated position shown in Fig. 4. In this position metallic plate 38 forms an electric bridge connecting contacts 41 and 21 and insofar as the mechanism 65 is concerned the circuit is closed to the motor 24.

Release of manual load on the key 12 causes interlocking frame 14 to be elevated sufficient to return gear 15 and pinion 74 to their normal intermeshed relation and this return is caused by the action of spring 48 sometimes hereinafter referred to as an interlocking switch frame elevating spring reacting between the bracket 14a at the bottom of frame 14 and the supporting base 60 (see Fig. 7). Screw stop 53 limits the depression of the interlocking frame 14 towards the base 60. At this time both the fixed contact 41 and the shiftable contact or contact plate lever 21 are bearing in electric engagement with the metal bridge plate 38 closing the motor circuit at this point.

In order to set the mechanism for subsequent operation so as to return the carriage by depressing the key 10 against the resistance imposed thereon by its biasing spring 52, the typewriter is first set with its line beginning and line ending stops located as desired, the carriage is moved to the line ending stop and the marginal key 12 depressed. The rotating of the mechanism 65 to its starting or zero position as above described causes setting cam 30 as it rotates to its starting position to bear on the cam lever 23 to locate the same at its zero or minimum run position. Pressure is then released on the marginal key 12 and the carriage is moved by usual manual action to its line beginning position. It will be understood that as the carriage is thus moved manually from left to right and thus to its line beginning position the mechanism 65 considered as a whole will rotate in synchronization with the extent of carriage movement and thus lower the cam lever 23 against the resistance of its return spring 47 relative to its starting or minimum run position shown in Fig. 4, a distance depending upon the length of travel of the carriage when so returned to its line starting position. When so set the operator can begin to type, and continue to type either to the end of the line or to some indeterminate position and then depress key 10 either partially or fully.

In order to permit a free coasting of the carriage after the motor has ceased to pull the tape onto the reel, even when the carriage starting and stopping positions are relatively close, that is, when both carriage stops are towards the right hand side of the platen, there is herein provided a permissible but limited degree of loose play between the levers 21 and 23. For this purpose the setting cam lever 23 has a boss 75 (see Fig. 6) which, after a limited degree of angular turn, bears against a projection 76 extending from the hub 77 of lever 21 so as to force it to rotate shaft 20 against the restraint imposed thereon by the braking load of brake 18. Expansion of spring 48 between main frame 50 and interlocking frame 14 engages gear 15 and pinion shaft 16. In this engaged position the adjusting nut of brake 18 is free of stop 46 allowing brake spring 19 to exert pressure on offset shaft drum 70 through brake 18. Contact lever 21 is fixed to lever shaft 20 and to all practical purposes, is a part thereof. The cam lever 23 has a free fit on shaft 20 and when depressed at its opposite end also moves contact lever an identical amount providing they are in relatively angular relation. This is accomplished despite the braking friction of the brake 18. Then as the end of lever 23 is allowed to return, contact lever 21 remains at the position placed thereby by lever 23 or may be set back to its zero position by depressing the key 12. This depression of key 12 lowers the side of frame 14, disengaging shaft 16 from gear 15 and at the same time lowers offset shaft 20 from brake 18 when adjusting nut 73 comes in contact with stop hanger 46 of main frame 20. Spring 22 then raises the free end of contact lever 21 until stopped by the boss lever 23. Contact plate lever return spring 22 is biased between lever 21 and contact post 41 and tends to elevate lever 21 towards its zero position on plate 38 and tends to maintain projection 76 in bearing engagement with boss 75. Lever 21 ceases to rotate when the carriage reaches the line beginning marginal stop preset as above indicated. During this setting operation contact plate 38 rotates while still engaged by lever 21, a distance corresponding to the desired length of carriage return coast. This permits the carriage to coast under its own momentum to the line beginning marginal stop on the machine even after the current flow through the motor has been intercepted as hereinafter described.

For the purpose of locking the motor circuit in position to maintain current through the motor even under conditions where the key 10 has been depressed only momentarily and then released, there is provided a master relay 40 to the armature 32 of which is fixed an armature contact plate 33. Insulation 78 insulates armature 32 from contact plate 33.

Positioned in the path of movement of the contact plate 33 when acting in the direction influenced by the energizing of relay 40 are three parallel and slightly spaced apart contact points 37, 35 and 34. Two of these points, to wit: point 34 hereinafter called a motor contact point and a point 35 hereinafter called a clutch motor contact point are located relatively close to the fulcrum 79 of the armature 32, and the third point 37, hereinafter sometimes referred to as the master relay contact point is spaced farthest from the fulcrum.

By reference to the wiring diagram of Fig. 8 it will be noted that there is provided a motor circuit which includes motor 24 grounded on one side through ground wire 89 and having its other side connected through an adjustable rheostat 44 and then to the motor contact point 34 through lead 81. Current is supplied from the house current through main lead 82 and branch lead 83 to energize contact plate 33. The current supply to the machine is controlled by a main switch (not shown) in the lead 82.

Means are provided to form a clutch magnet circuit which includes a clutch magnet 36 grounded on one side through ground wire 80 and having its other side connected through conductor 84 to the middle contact point 35.

There is also provided means to form a master relay circuit which includes a master relay 40 grounded on one side through relay ground wire 85 leading to a ground wire 80. The other side of relay 40 is connected to the contact post 41. Plate 38 forms in effect a rotating electric bridge which provides contact between post 41 and shiftable lever 21, whenever lever 21 is on the metallic portion of the plate. Lever 21 is connected electrically to contact point 37 through wire 87.

In operation and let it be assumed that the device has been set as previously described to operate between the stops set and particularly the line beginning stop on the typewriter, the operator types conventionally until the end of the line or other stopping place and then key 10 is depressed. The key 10 when so depressed moves in the direction indicated by the long arrow in Fig. 8. Considering the situation first when the key is depressed not to its full extent but simply a distance sufficient to act on relay armature 32 a distance to cause contact plate 33 to engage both of the contact points 34 and 35. Incidentally it is noted that in the showing in Fig. 8 the former is slightly in advance of the latter but this is not essential and both contacts 34 and 35 may be engaged and the circuits closed through both at the same time. In this relation of the contact plate 33 a circuit will be closed through the motor circuit to cause motor 24 to start rotating. At the same time, or in a very short interval of time thereafter, the clutch magnet circuit will be closed, thus energizing the magnet 36 and causing it to draw its armature 45 in the direction to effect an interengaging of the clutch at 27. In this way the rotating motor is connected to cause the reel to wind up the tape and thus shift the carriage towards its line starting position. This shifting of the carriage will continue as long as there is manual load imposed upon the partially depressed key and of course if the pressure is maintained sufficiently long the carriage will eventually be returned to its preset line starting position. By releasing pressure on the partly depressed key the circuits will be broken through both the motor 24 and clutch magnet 36 with the result that further draft tension on the tape is released and the carriage will stop instantly at the point where pressure is released on the key.

When the key 10 is fully depressed, it additionally closes the master relay circuit which has the effect of attracting armature 32 to cause contact plate 33 to be locked magnetically in its position closing all three circuits and this will persist so long as relay 40 is energized. In this position the master relay 40 is energized by current flowing from the main line 82 through branch lead 83 to contact plate 33, hence through point 37, wire 87, lever 21, plate 38, contact on post 41 to the grounded master relay 40. The circuit is maintained through relay 40 until released by the circuit being broken due to the rotation of contact plate 38 from its circuit closing to a circuit breaking position, that is when contact insulating space 66 comes under the live end of the lever 21. As to when the several circuits will be broken is controlled by the location of the predesigned recess or blank space 66 found in the advancing side of the contact plate 38. In effect contact 21 moves on to the insulating space 66 after the motor driven reel has turned over that preset number of turns necessary to wind that length of tape which has been set as above indicated by the initial setting of the motor release mechanism 65.

When the circuits are broken by the metallic plate 38 rotating into position to pass from under lever 21, the clutch magnet 36 is of course no longer energized, and its combined armature or clutch lever 45 is actuated by clutch lever return spring 51 to disengage clutch spur 27 from reel 28. At the same time motor 24 has slowed down and stopped. The parts are thus again in their initial position ready to return the carriage to its line starting position, either a partial return by a partial depression of the key 10, or a full automatic return by full depression of the key 10.

Should it be desired to reset the typewriter to a new line beginning position, the usual line beginning stop on the typewriter is shifted conventionally to the newly desired position, key 12 is depressed for a time sufficient to permit the release mechanism 65 to reset the contact 21 to its zero or minimum run position, pressure on key 12 is released to reengage mechanism 65 with the motor driven parts, and the carriage again moved manually to its line beginning position, thus again rotating the plate 38 to bring its metallic surface beneath the contact 21. The operator then starts to typewrite and when arriving at the point where the carriage is to be returned, the main key 10 is depressed either partially or fully as previously described.

By means of the carriage return device such as is herein disclosed it is possible to effect a return of the carriage by mechanism which is largely electrical and in this way there has been eliminated the usual large number of small mechanical parts which have characterized known forms of carriage return devices. Incidentally there has been largely eliminated the possibilities of inaccuracies such as occur in the setting mechanism of known devices which uncertainty in settings develops after long use by reason of the wear in the mechanical control parts. In this device the current is off except when actually drawing the carriage and sparking points have been eliminated and there is thus effected a saving in operating cost.

It is particularly noted that the operator has full control of the carriage return, either automatically to its starting position or to any desired intermediate position simply by the manipulation of a single control key.

I claim:

1. In a typewriter carriage return mechanism, a combination of a carriage shifting reel provided with an element of a clutch, a coacting clutch element, a clutch magnet for actuating said clutch, a motor for driving the coacting clutch element, a pinion shaft driven by the reel, an automatic motor release mechanism driven from the pinion shaft and provided with a rotating contact plate, a fixed contact and a shiftable contact bridged by the rotating contact plate during a portion of the rotation of the release mechanism, a master relay provided with an armature, an armature contact plate carried by and insulated from the armature, three contact points disposed in the path of movement of the armature contact plate when moved in the direction imposed thereon by the master relay when energized, a source of electric energy leading to the armature contact plate, means forming a motor circuit including the motor and one of said points, means forming a clutch magnet circuit including said clutch magnet and another of said points, means forming a master relay circuit including the master relay, said fixed and shiftable contacts with the rotating bridging contact plate therebetween and the third of said points, and a carriage return key operable to move the armature contact plate into circuit closing position engaging said three points thereby to close the circuit through the motor, clutch magnet and master relay.

2. In a typewriter carriage return device, the combination of mechanism for returning the carriage to its line starting position, said mechanism including a motor, a reel, a clutch between the motor and reel, and means for moving the clutch into an operative clutching position, a control for the circuit which includes the motor, said control including a pair of contacts and a unit mounted for rotary movement and including a face formed of conductive and insulating areas movable across said contacts, said unit being driven from the reel and having two positions, in one position connecting the contacts by means of its conductive area for completing the circuit through the motor and in another position intercepting the current flow to the motor by means of its insulating area, and means gearing the unit to the reel whereby the reel changes the unit from one to its other position following a preset number of rotations of the reel independently of the motor rotation.

3. In a typewriter carriage return device, the combination of mechanism for shifting a typewriter carriage from a line ending to a line beginning position, including a tape connected to the carriage and a reel on which the tape is wound, said mechanism including means forming a motor circuit including a motor for winding the tape on the reel, said circuit also including an automatic motor release mounted for rotary movement and connected with the reel to turn therewith, and also said motor circuit including a pair of contacts, one relatively fixed and the other shiftable, said rotary release including a rotary bridge plate provided with conducting and insulating areas for completing and breaking the motor circuit depending upon the rotative position of these areas on the bridge plate relative to the shiftable contact as the bridge plate turns in synchronism with the tape winding reel, a setting cam turning in synchronism with the tape winding reel, and a setting cam lever controlled by the cam for setting the shiftable contact on to the insulating area adjacent to the point where the shiftable contact leaves the conducting area in its minimum run position and thus setting it relative to the bridge plate.

4. In a typewriter carriage return device, the combination of mechanism for shifting a typewriter carriage from a line ending to a line beginning position including a tape connected to the carriage and a reel on which the tape is wound, an automatic motor release mechanism turning with the reel, said release mechanism constituting a rotating unit including a cam, a gear and an insulated contact plate provided with a conducting area and with an insulating area, an electric motor driving the gear, control means for disconnecting the gear from the motor when setting the release mechanism relative to the line beginning position of the associated typewriter, a pair of contacts and said contact plate included in the circuit containing said motor, one of said contacts being shiftable relative to the conducting and insulating areas on the contact plate to control the permissible coast of the carriage when free from the torque force of the motor and a setting cam lever controlled by the cam and operable on the shiftable contact to locate it close to the point where it passes from the conducting area onto the insulating area and thus to locate it in its minimum run position and the rotation of said contact plate causing said shiftable contact to engage the insulating area of the contact plate to interrupt the current flow through the motor following a preset run of the motor.

5. In a typewriter carriage return device, the combination of mechanism for shifting a typewriter carriage from a line ending to a line beginning position including a tape connected to the carriage and a reel on which the tape is wound, a motor and a one way clutch connection for driving the reel from the motor when the clutch connection is in its operative driving condition, a control for the circuit which includes the motor, said control including a fixed contact, a shiftable contact, a rotating contact plate driven from the reel for controlling the motor circuit in the part thereof between the two contacts, means for adjusting the relation between the contact plate and the shiftable contact and means controlled by the desired run of the typewriter carriage for setting the shiftable contact to its line beginning position.

6. In a typewriter carriage return device, the combination of mechanism for shifting a typewriter carriage from a line ending to a line beginning position including a tape connected to the carriage and a reel on which the tape is wound, an automatic motor release mechanism turning with the reel, said release mechanism constituting a rotating unit including a cam, a gear and a contact plate of circular form having a conductive part and a non-conductive part in which the lower edge of the non-conductive part is in the form of an arc extending from adjacent the center of rotation to the outer edge, an electric motor for driving the gear, a pair of contacts and said contact plate included in the circuit containing said motor, one of said contacts being shiftable to a preset position to control the permissible coast of the carriage when free from the torque force of the motor and a cam lever normally bearing on the cam and controlled thereby to effect a shifting of the shiftable contact to locate it in that position relative to the conductive and non-conductive parts of the contact plate which defines its minimum run position and said shiftable contact movable by the motor into a position off the conductive part of the contact plate thereby to interrupt the current flow through the motor following a preset run of the motor.

7. In a carriage return mechanism for typewriters, the combination of an electric motor, means including a clutch and an electromagnet for controlling the clutch for operatively connecting the motor to the carriage of a typewriter, a carriage return key having a partially depressed operative position and a fully depressed operative position, means forming a motor circuit including the motor and a normally open switch, said key being operatively connected to the switch to close only the motor circuit when the key is partially depressed and to open the motor circuit when the key is permitted to return to its normal inoperative elevated position, a relay for holding the switch in its circuit closing position, means forming a relay circuit including the relay and a rotatable switch driven from the motor and turned thereby from a circuit closing to a circuit breaking position and controlled in its movement from one to the other position by the desired run of the motor, means controlled by the key when in its fully depressed position to close the circuit through the relay and means controlled by the key when in an intermediate position between said partially and fully depressed positions for energizing said clutch controlling electromagnet.

8. In a carriage return mechanism for typewriters, the combination of an electric motor, means for operatively connecting the motor to the carriage of a typewriter to return the same to an initial position, means including the motor forming a motor circuit, a single switch normally open in the motor circuit, a carriage return key having a partially depressed operative position and a fully depressed operative position, said key in its partially depressed position acting on said switch to close the motor circuit, an automatic circuit release mechanism driven from the first named means and having a circuit opening and a circuit closing position controlled by the desired return run of the carriage to break the circuit independently of the position of the key, means forming a relay circuit including said release mechanism and a relay operating when energized to lock the circuit closed up to the release mechanism, and said key in its fully depressed position acting to close the relay circuit up to the automatic release mechanism independently of the electric condition of the relay.

9. In a typewriter carriage return device, the combination of means for returning the carriage including an electric motor, a switch for controlling the motor circuit including a pair of relatively shiftable contacts, means for presetting the spaced apart relation of the contacts, and an electric bridge for connecting the contacts to close the circuit through the motor, said bridge including an insulating area movable by the bridge into engagement with one of the contacts to break the motor circuit, and means actuated by the motor and acting on the bridge for moving it into position interrupting the current flow after the motor has made a run determined by the preset spacing of the contacts.

10. In a typewriter carriage return device, the combination of means forming a motor circuit including a motor and mechanism controlled thereby for shifting a typewriter carriage automatically from a line ending to a line beginning position, two circuit closers included in the motor circuit for controlling the current flow through the motor, one of said circuit closers being manually operable and the other constituting a switch remote from the carriage and not directly connected thereto, said switch having a contact adjustable relative to a circuit intercepting position, a manually operable control for setting the contact in an adjustable zero position corresponding to any desired line beginning position of the carriage and means controlled by the run of the carriage from said line ending to said line beginning position and independent of the status of said manually operable circuit closer to cause the switch to intercept the current flow to the motor just before the carriage reaches its line beginning position and thus permit the carriage to coast under its own momentum between the time when the current is so intercepted and the arrival of the carriage at its line beginning position.

11. In a typewriter carriage return device, the combination of mechanism for returning the carriage including an electric motor, a clutch for connecting the motor with the balance of said mechanism, means forming a motor circuit including the motor grounded on one side and a motor contact point, means forming a clutch magnet circuit including a clutch magnet grounded on one side for controlling the clutch and a clutch magnet contact point, an armature contact plate related to the two contact points to close first the motor circuit and then the clutch magnet circuit in succession, a key operable in one direction for actuating the armature contact plate, a master relay provided with an armature for locking the contact plate in its circuit closing position and means controlled by said key for energizing said master relay.

12. In a typewriter carriage return device, the combination of mechanism for returning the carriage including an electric motor, means forming a motor circuit including the motor and a motor contact point, means forming a clutch magnet circuit including a clutch magnet and a clutch magnet contact point, a clutch controlled by said magnet for connecting the electric motor with the balance of the mechanism leading to the carriage, an armature contact plate related to the two contact points to close the motor circuit and the magnet circuit and a key operable in one direction for causing the contact plate to engage said two contact points.

13. Carriage return mechanism for typewriters comprising an electric motor, rotative draft means operatively connecting the motor to the carriage of a typewriter for moving the carriage in one direction and constituting the sole connection between said motor and the carriage, means including the motor and a single normally open circuit closer forming a motor circuit, means forming a relay circuit and including said single circuit closer and a master relay having its armature fixed to the movable element of said circuit closer to operate therewith, a control key operatively connected through the armature of the master relay to the single circuit closer to close both the motor and relay circuits and to start the draft means to function and means intergeared with the draft means and controlled by the rotation thereof for automatically intercepting the current flow through the relay circuit at the termination of a preset number of rotations of the draft means while leaving the control key in operative control of the motor circuit.

14. Carriage return mechanism for typewriters comprising an electric motor, means for operatively connecting the motor to the carriage of a typewriter, a relay provided with a relay armature, an armature contact plate carried by the armature, means for supplying electric current to said armature contact plate, two contact points in the path of movement of the armature contact plate when moving in the direction influenced by the energized relay, one of said contacts being disposed in advance of the other and thus first energized by the armature contact plate, means forming a motor circuit including said motor and the point first to be energized, a rotating electric contact plate driven by the motor, means forming a relay circuit including said relay, said rotating plate and the other point and said rotating plate operable in one position to close the relay circuit and in another position to break the relay circuit and a return carriage key operatively connected when depressed to move the armature contact plate into circuit closing engagement with the two said points.

15. In a typewriter carriage return mechanism, the combination of a carriage shifting reel provided with an element of a clutch, a motor driven coacting clutch element, a clutch magnet for actuating said clutch, a pinion shaft on which the reel is mounted and an automatic motor release mechanism, a reducing gear train for driving said mechanism from the pinion shaft and said mechanism including an electric rotatable contact plate, means forming a relay circuit including a relay, a motor for driving the coacting clutch element, means controlled by the relay for locking the circuit closed through the motor and means controlled by the rotation of the contact plate to break the motor circuit.

16. In a control for a motor circuit, the combination of means forming a motor circuit and including a motor, a key controlled switch and a unit including two contacts and a contact plate mounted for rotary movement relative to the two contacts, an automatic motor release including in sandwich relation the said contact plate provided with a cut out portion, an insulation plate exposed through the cut out portion, a gear and a cam all secured together to form a unit mounted for rotary movement, a gear drive between the motor and said gear whereby the release turns with the motor, one of said contacts being fixed and at all times in mechanical and electric engagement with the contact plate, a lever shaft offset from the unit, a cam lever actuated by the cam and loose on the shaft to turn the same, the other contact forming a contact plate lever secured to the lever shaft and having its free end either engaging the contact plate to complete the motor circuit at this point or engaging said insulation plate through the cut out in the contact plate to intercept the motor circuit at this point depending on the rotative position of the contact plate at the time, and a loose driving connection between the contact plate lever and the cam lever, organized to permit a slight movement of the chain of parts comprising the cam, the cam lever and the lever shaft without affecting the position of the contact plate lever.

17. A wiring system for a carriage return mechanism including the combination of means forming a motor circuit together with a motor and a motor contact point on one side of the motor, the other side being grounded, means forming a clutch magnet circuit including a clutch magnet and a clutch magnet contact point on one side of the magnet, the other side of the magnet being grounded, means forming a master relay circuit, including a master relay grounded on one side, the opposite side having connected thereto a chain of parts including an electric contact plate, a contact plate lever and a master relay contact point, a master relay armature coacting with the master relay, an armature contact plate movable with the master relay armature for engaging said three contact points to close the circuit through their respective circuits, a manually actuated key for moving said armature contact plate into circuit closing position and means for connecting one side of the source of electric energy to the armature contact plate.

18. In a device of the class described, the combination of mechanism for returning the carriage of a typewriter to its line beginning position, a motor for driving said mechanism, means forming a motor circuit including the motor and a motor contact point, means forming a master relay circuit and including an electromagnet and a master relay point disposed adjacent the motor control point and electrically independent thereof, a contact plate spring-biased to move it away from said contact points and into its inoperative circuit breaking position, said plate constituting the armature of the electromagnet and movable in the direction influenced by the electromagnet to engage both of said contact points thereby to close the circuit through the motor and the electromagnet, and said master relay circuit including a circuit closer having its movable element operatively connected to the motor to be rotated thereby and related to the carriage return mechanism to maintain the circuit closed through the electromagnet and thus cause the electromagnet to maintain the motor circuit closed during at least the initial part of the carriage return movement and controlled by the subsequent run of the carriage beyond said initial part of the run to break the relay circuit and thus permit the spring biased armature to intercept the motor circuit and manually controlled means acting on the armature to maintain the motor circuit closed independently of the electric status of the master relay circuit.

19. In a device of the class described, the combination of a pinion shaft provided at one end with a pinion, a reel carried by the shaft, a motor for driving the shaft and reel, a circuit closer for closing the circuit through the motor, a vertically movable switch frame, an automatic motor release mechanism for subsequently intercepting the circuit through the motor and including a switch controlled by the rotative position of said mechanism, said mechanism carried by the frame and including a gear normally in mesh with the shaft pinion and thus driven from the motor, a key for depressing the frame to intercept the driving connection momentarily between the gear and pinion, a spring acting on the mechanism to rotate it to a zero position automatically when thus free from the pinion shaft and means operable on the release of said key for reestablishing the driving connection and thus causing the motor when its circuit is closed through said circuit closer to drive the reel for a time determined by the setting of the release mechanism.

20. In a typewriter carriage return device, the combination of mechanism for returning the carriage to its line starting position, an electric motor, a make-and-break driving connection between the motor and said mechanism, a switch for controlling the motor, a control for the switch, means for setting the switch control in circuit closing position in spaced relation to the position corresponding to line starting position of the associated typewriter carriage, said switch control maintaining the circuit so closed during a part of the carriage run and having a driving connection with the carriage return mechanism to move the switch control into its circuit breaking position as the carriage nears its line starting position and key controlled means for breaking the driving connection between the carriage return mechanism and the switch control to permit a change in the relative relation between the carriage and said control.

21. In a typewriter carriage return device, the combination of a mechanism including an electric motor for returning the carriage towards its line starting position, means forming a motor circuit including a manually actuated circuit closer for initially closing the circuit and a spring acting thereon to return it to its normal circuit breaking position when free of the manual load, a relay for locking the circuit closer electromagnetically in its closed position after the circuit has been closed manually and a control for the relay including a rotatable contact driven from the motor and a coacting relatively fixed contact and manually manipulated setting means for relatively adjusting the rotatable and fixed contacts for defining the permissible duration of the motor run before its circuit is intercepted.

22. In a device of the class described, the combination of mechanism including an electric motor and means for connecting the same to the carriage of a typewriter for returning the carriage to its line starting position, means forming a motor circuit and including a normally open circuit closer, a master relay having its armature operatively connected to the circuit closer to hold the same electromagnetically in its circuit closing position until the motor has turned over a preset number of revolutions, a single manually actuated key for closing the motor circuit closer and for closing the circuit including the master relay, and means controlled by the motor for causing the master relay to become de-energized automatically and thus release its holding effect on the circuit closer when the motor has so turned over its prescribed number of revolutions without affecting the closed circuit condition of the motor circuit.

23. In a typewriter carriage return mechanism, the combination of a typewriter including its carriage, mechanism including a motor operatively connected to the carriage for returning the same to its line starting position, control means for automatically controlling the run of the motor and thus for controlling the length of carriage run towards its line beginning position when propelled by the motor, said automatic control means including a pair of relatively fixed contacts and a plate mounted for rotary movement synchronized with the motor rotation and cooperating with the contacts to close the circuit through the contacts during a preset number of degrees of rotation of the plate and thus of the motor and to break the circuit when the plate has rotated into the position which is necessary to break the circuit through said contacts, a driving connection between the carriage return mechanism and the plate, and reset means operative when said driving connection is intercepted to adjust the relation between the carriage return mechanism and plate, said driving connection being automatically effective upon manual resetting of the carriage to new line starting position following operation of said reset means to locate the plate relative to the contacts.

24. In a carriage return device for typewriters, the combination of means for returning the typewriter toward its line beginning position including an electric motor, means forming a motor circuit including the motor, a pair of contacts and a motor release mechanism mounted for rotary movement and driven from the motor, said mechanism including a rotary plate in one position completing the circuit between said contacts and in another position removed from one of the contacts and thus breaking the motor circuit when the motor rotative plate reaches such position, said mechanism also including a setting cam fixed to and turning with the plate, a shaft provided with a cam lever actuated by the cam to turn the shaft about an angle determined by the contour of the cam as it rotates relative to the plate and one of said contacts operatively connected to the shaft and adjustably located relative to said rotating plate by the angular degree of rotation of the shaft as so set by the plate governed rotation of the cam.

25. In a typewriter carriage return device, the combination of means including a reel adapted to be attached to a typewriter carriage to return it to its line beginning position, an electric motor adapted to be connected to said reel for returning the carriage from any position into which it may have been advanced by the typing operation back towards its line beginning position, means forming a motor circuit and including in addition to the motor a manually actuated key for initially closing the circuit through the motor and an automatic circuit breaker including a movable contact operatively connected to the motor to be driven thereby and organized to intercept the motor circuit after the motor has turned the reel over a prescribed number of turns, said circuit breaker also including a pair of relatively fixed contacts and said movable contact adapted to be related to the desired carriage movement to maintain the circuit closed while the carriage is in the initial part of the return movement and for intercepting the circuit before the carriage has reached its line beginning position, a manually actuated key for intercepting the driving connection between the motor and said circuit breaker, a spring acting on the movable contact of the circuit breaker to return it to a zero position when disconnected from the motor and means controlled by the turning of the reel for resetting the relative position of the fixed and movable contacts to reset their position relative to the desired line beginning position of the carriage.

26. In a typewriter carriage return device, the combination of means adaptive to be attached to a typewriter carriage to return it to its line starting position, an electric motor for actuating said means, a switch for controlling the circuit which includes the motor, said switch including a pair of relatively shiftable contacts, means operable after the motor becomes deenergized from the carriage return means for adjusting the relative position of the contacts to correspond to any selected point at which the carriage should start under motor load and be free of the motor load, and bridging means mounted for rotary movement, geared to the motor and controlled by the desired run of the motor for causing the bridging means to move into position interrupting the circuit between said contacts at the point so preset at which the carriage should be free of the motor load.

27. The combination of a typewriter including its carriage and its conventional stops for setting its line beginning position, mechanism including a motor for returning the carriage at will from any position to which it may be advanced during typing back to whatever may be its line beginning position at the time, means forming a motor circuit including said motor and two circuit controlling switches, one being manually operable to close the circuit through the motor, the other connected to said mechanism and controlled automatically by the run of the mechanism after the circuit has been closed manually, said other switch including a pair of relatively movable contacts, one being substantially fixed and the other forming a part of a rotatable member geared to said mechanism to turn therewith, said contacts providing an interconductive range of movement terminating at one end in a circuit breaking area, and said rotatable contact acting to move relative to the substantially fixed contact along the interconductive path for a distance corresponding to the desired length of the initial part of the carriage return and disposed to move on to the circuit breaking area before the carriage reaches its line beginning position and means controlled automatically by the manual resetting of the carriage to a new line beginning position for resetting the relation between the fixed contact and the movable contact so as to reset the point at which the movable contact moves from the conductive area on to the insulating area to correspond with any new line beginning position to which the conventional stops are reset.

28. In a typewriter, the combination with its carriage and mechanism including a motor and a circuit closer therefor for returning the carriage at will from any position to which it may be advanced during typing back to whatever may be its line beginning position at the time, a disconnectable connection between the motor and carriage, an automatic control for the motor circuit including a pair of contacts, one being relatively fixed and the other movable, the movable contact being normally geared to the motor when said disconnectable connection is closed for controlling the period of time measured in motor rotations during which the carriage is shifted under power from the motor, and means controlled by the manual resetting of the carriage when disconnected from the motor into a new line beginning position for simultaneously resetting said movable contact of the control automatically to intercept the motor circuit at a new point in the carriage travel.

29. In a typewriter carriage return mechanism, the combination of a pinion shaft, a ribbon winding reel secured to the shaft and provided with an element of a one-way clutch arranged to turn the reel in one direction and said reel being at all times spring biased to move in one rotary direction to take up slack on the tape as it is wound on the reel, a unit slidably mounted on the pinion shaft and including a toothed clutch spur gear forming the companion element of the first named element, electromagnetically actuated means engaging the unit for shifting the clutch into its operative clutching position, and means for driving the reel through the clutch, said means including a motor and a reducing gear train between the motor shaft and said shiftable unit.

30. The structure defined in claim 29 and in which the electromagnetically actuated means is normally spring biased to an inoperative unclutched position and is included in a clutch magnet circuit which also contains a controlling switch in turn controlled by the rotation of the pinion shaft whereby the electromagnetically actuated means becomes de-energized after the reel has turned over a prescribed number of rotations.

31. In a typewriter carriage return device, the combination of mechanism for returning a carriage and including a take-up reel, a pinion shaft on which the reel is mounted to turn therewith, a small pinion at one end of the shaft turning therewith, a control unit mounted for rotary movement and including a gear normally enmeshed with the small pinion, a spring acting on the control unit tending to maintain a driving connection between the pinion shaft and the control unit, said unit including an electric contact plate provided with a conductive area and a non-conductive area forming a bridging space of insulating material, a motor for driving the reel, a normally inoperative clutch between the motor and the reel carrying pinion shaft, and means forming a motor circuit including the motor and a pair of contacts normally in electric contact with the contact plate and adjustable relative to the point where it moves from the conductive part over the nonconductive part forming the insulating bridge.

32. A control for a typewriter carriage return, including a motor driven pinion, a key controlled interlocking frame provided with a mounting stud, a motor release mechanism including a spur gear loose on the stud and adapted when shifted by the frame to mesh with the pinion, a contact plate secured to one side of the spur gear, a cam secured to the other side of the spur gear, a lever shaft carried by the frame and provided with a cam engaging lever controlled by the cam to rock the lever shaft, and a shiftable contact carried by the lever shaft, movable therewith and in operative engagement with the contact plate, said contact plate provided with an insulating portion which passes across the shiftable contact as the plate rotates by reason of the rotation of the motor to intercept current transmission between the contact plate and the shiftable contact.

33. The control defined in claim 32 and in which a brake acts normally on the lever shaft in a tendency to resist any accidental rotation thereof and means controlled by the shifting of the interlocking frame incidental to disconnecting the spur gear from the pinion causes the brake to become inoperative.

HERMAN W. DECKER.

REFERENCES CITED

The following references are of record in the file of this patent:

UNITED STATES PATENTS

| Number | Name | Date |
|---|---|---|
| 1,087,494 | James | Feb. 17, 1914 |
| 2,264,129 | Cattucci | Nov. 25, 1941 |
| 909,539 | Burlingame | Jan. 12, 1909 |
| 1,094,609 | Sokolov | Apr. 28, 1914 |
| 1,563,702 | French et al. | Dec. 1, 1925 |
| 1,951,517 | Maul | Mar. 20, 1934 |

FOREIGN PATENTS

| Number | Country | Date |
|---|---|---|
| 698,050 | Germany | 1940 |